(12) United States Patent
Chen et al.

(10) Patent No.: US 8,381,034 B2
(45) Date of Patent: Feb. 19, 2013

(54) METHOD FOR TESTING SERVER SUPPORTING INTELLIGENT PLATFORM MANAGEMENT INTERFACE

(75) Inventors: Zhen Chen, Tianjin (CN); Qiu Yue Duan, Tianjin (CN); Chih Feng Chen, Taipei (TW)

(73) Assignee: Inventec Corporation, Taipei (TW)

( * ) Notice: Subject to any disclaimer, the term of this patent is extended or adjusted under 35 U.S.C. 154(b) by 210 days.

(21) Appl. No.: 12/974,047

(22) Filed: Dec. 21, 2010

(65) Prior Publication Data

US 2012/0011402 A1    Jan. 12, 2012

(30) Foreign Application Priority Data

Jul. 7, 2010    (CN) .......................... 2010 1 0222600

(51) Int. Cl.
*G06F 11/00*    (2006.01)

(52) U.S. Cl. ................................... 714/36; 713/1; 713/2

(58) Field of Classification Search ..................... 714/36; 713/1, 2
See application file for complete search history.

(56) References Cited

U.S. PATENT DOCUMENTS

| 2004/0267483 A1* | 12/2004 | Percer et al. .................. 702/118 |
| 2007/0027981 A1* | 2/2007 | Coglitore et al. .............. 709/224 |
| 2007/0234123 A1* | 10/2007 | Shih et al. ....................... 714/36 |

* cited by examiner

*Primary Examiner* — Yolanda L Wilson

(74) *Attorney, Agent, or Firm* — Morris Manning & Martin LLP; Tim Tingkang Xia, Esq.

(57) ABSTRACT

A testing method for a server supporting an intelligent platform management interface (IPMI) is applied to test a server before an operating system (OS) of the server operates. The test method includes the following steps. A baseboard management controller (BMC) of the server is activated. The server is activated, and a monitoring module is operated. Real-time status data of the server stored in the BMC of the server is obtained. The monitoring module executes a pre-test procedure according to the real-time status data of the server before the OS operates. A test result of the pre-test procedure is stored.

9 Claims, 4 Drawing Sheets

METHOD FOR TESTING SERVER SUPPORTING INTELLIGENT PLATFORM MANAGEMENT INTERFACE

CROSS-REFERENCE TO RELATED APPLICATIONS

This non-provisional application claims priority under 35 U.S.C. §119(a) on Patent Application No(s). 201010222600.4 filed in China, P.R.C. on Jul. 7, 2010, the entire contents of which are hereby incorporated by reference.

BACKGROUND OF THE INVENTION

1. Field of Invention

The present invention relates to a method for testing a server, and more particularly to a method for testing a server supporting an intelligent platform management interface (IPMI).

2. Related Art

With the popularity of computers and the rapid development of network technology, desired information can be quickly obtained through the network, and diversified services can also be obtained. However, due to the increasingly advanced technologies applied in the network, services only provided by ordinary computers or devices are far from enough, and thus the server technology is proposed. A server is a computer platform that is good at dealing with the network technology, and may be connected to various network systems, such as Internet, intranet, extranet, and Local Area Network (LAN). The server provides various application services to a computer connected through the network system.

In order to ensure the stability of a server when providing services, a stress test is considered as one of the critical test items before the server is delivered. The test of the server is mainly testing each important element of the server, such as a central processing unit (CPU) or a network interface card (NIC), so as to determine whether the server can normally run under certain stress.

However, the test procedure in a conventional test method needs to be operated on the operating system (OS) of the tested server. Since the test needs to be supported by the OS, the conventional test procedure cannot cover the functions of reboot or shutdown. Similarly, the conventional test procedure cannot be operated before the OS operates, and thus whether the server works properly before the OS is started cannot be tested.

In other words, the conventional method for testing a server can only be performed when the OS of the tested server operates, and thus the server may not be fully tested.

SUMMARY OF THE INVENTION

In one aspect, a method for testing the server supporting an intelligent platform management interface (IPMI) is provided, which is applied to test a server before an operating system (OS) of the server operates. The method comprises the following steps. A baseboard management controller (BMC) of the server is activated. The server is activated, and a monitoring module is operated. Real-time status data of the server stored in the BMC is obtained. A pre-test procedure is executed according to the real-time status data of the server before the OS operates. A test result of the pre-test procedure is stored.

The pre-test procedure may comprise a power management switch test procedure, an OS loading test procedure, a reboot test procedure, or a basic input/output system (BIOS) loading test procedure that is performed for the server. The power management switch test procedure may comprise a switch test procedure performed among multiple advanced configuration and power management interface (ACPI) operating modes of the server after a BIOS period of the server.

The method for testing the server supporting the IPMI further comprises: executing a post-test procedure, so as to realize a full life cycle test. The post-test procedure may comprise a central processing unit (CPU) test procedure, a memory test procedure, a storage device test procedure, or a network interface card (NIC) test procedure.

The method for testing the server supporting the IPMI further comprises: powering on or off the server through the BMC.

According to an embodiment, the monitoring module is operated in a remote workstation, and the BMC transmits the test result to the monitoring module. Therefore, the load of the tested server can be reduced.

According to another embodiment of the present invention, the monitoring module is operated in the tested server.

In view of the above, in the method for testing the server supporting the IPMI, the BMC executes the pre-test procedure, and thus the test can be performed before the OS operates. In other words, the present invention provides tests executed before the OS operates, such as a stress test, a load balance test, a reboot test, a BIOS loading test, or an OS test. Moreover, a full-life-cycle server test may be realized with various conventional tests executed after the OS operates.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

The detailed features and advantages of the present invention are described below in great detail through the following embodiments, and the content of the detailed description is sufficient for persons skilled in the art to understand the technical content of the present invention and to implement the present invention there accordingly. Based upon the content of the specification, the claims, and the drawings, persons skilled in the art can easily understand the relevant objectives and advantages of the present invention.

Figure 1A:
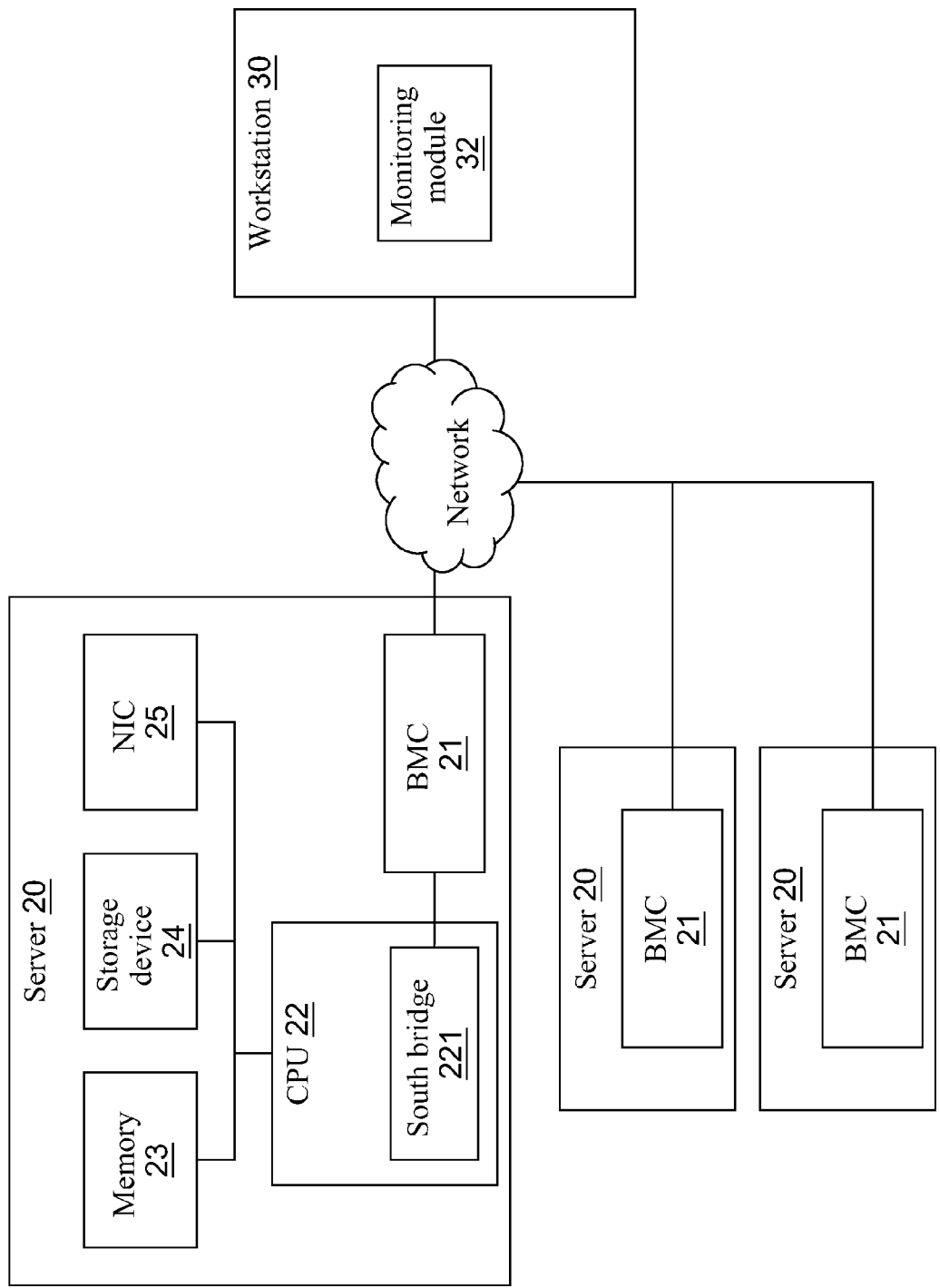
FIG. 1A is a schematic view of a server according to an embodiment.

An method for testing a server supporting an intelligent platform management interface (IPMI) is provided, which is applied to test the server before an operating system (OS) of the server operates. FIG. 1A is a schematic view of a server according to an embodiment of the present invention.

The server 20, supporting the IPMI, comprises a central processing unit (CPU) 22, a memory 23, a storage device 24, and an network interface card (NIC) 25, and further comprises a baseboard management controller (BMC) 21 connected to a south bridge 221 of the CPU 22.

The server 20 may use the OS such as Linux and FreeBSD of Unix, or Windows Server 2003 of Microsoft; and may also use a disk operating system (DOS) or an extensible firmware interface (EFI) system. The server 20 may adopt various server products of different brands, which is not limited in the present invention.

A workstation 30 may monitor the server 20 through a network and the BMC 21, and both the workstation 30 and the BMC 21 of the server 20 meet the specifications of the IPMI. The workstation 30 can provide functions such as remote monitoring, management, error diagnosis, and system recovery for the server 20 through the BMC 21. In addition, according to an embodiment of the present invention, the workstation 30 may be simultaneously connected to the BMCs 21 of multiple servers 20 through the network, and thus simultaneously monitor the multiple servers 20. Generally, the workstation 30 provides an intelligent platform management bus (IPMB) communicating with the BMC 21.

More specifically, the IPMI is a standard architecture of a server management platform, which comprises five elements of the BMC 21, a system interface, a non-volatile storage, the IPMB, and an intelligent chassis management bus (ICMB), in which the BMC 21 is the most important.

The BMC 21 of the server 20 may also be called a management chip, which can monitor the operating status of hardware modules through sensors configured in the hardware modules of the server 20, such as the CPU 22, the memory 23, the storage device 24, and the NIC 25. Moreover, the server 20 may be freely powered on or off through the BMC 21.

In addition, the BMC 21 is like an independent computer, having a built-in processor, a memory module, and other resources. The BMC 21 may operate before the server 20 is powered on, and the operation of the BMC 21 uses its own resources instead of occupying other resources of the hardware modules of the server 20.

Figure 1B:
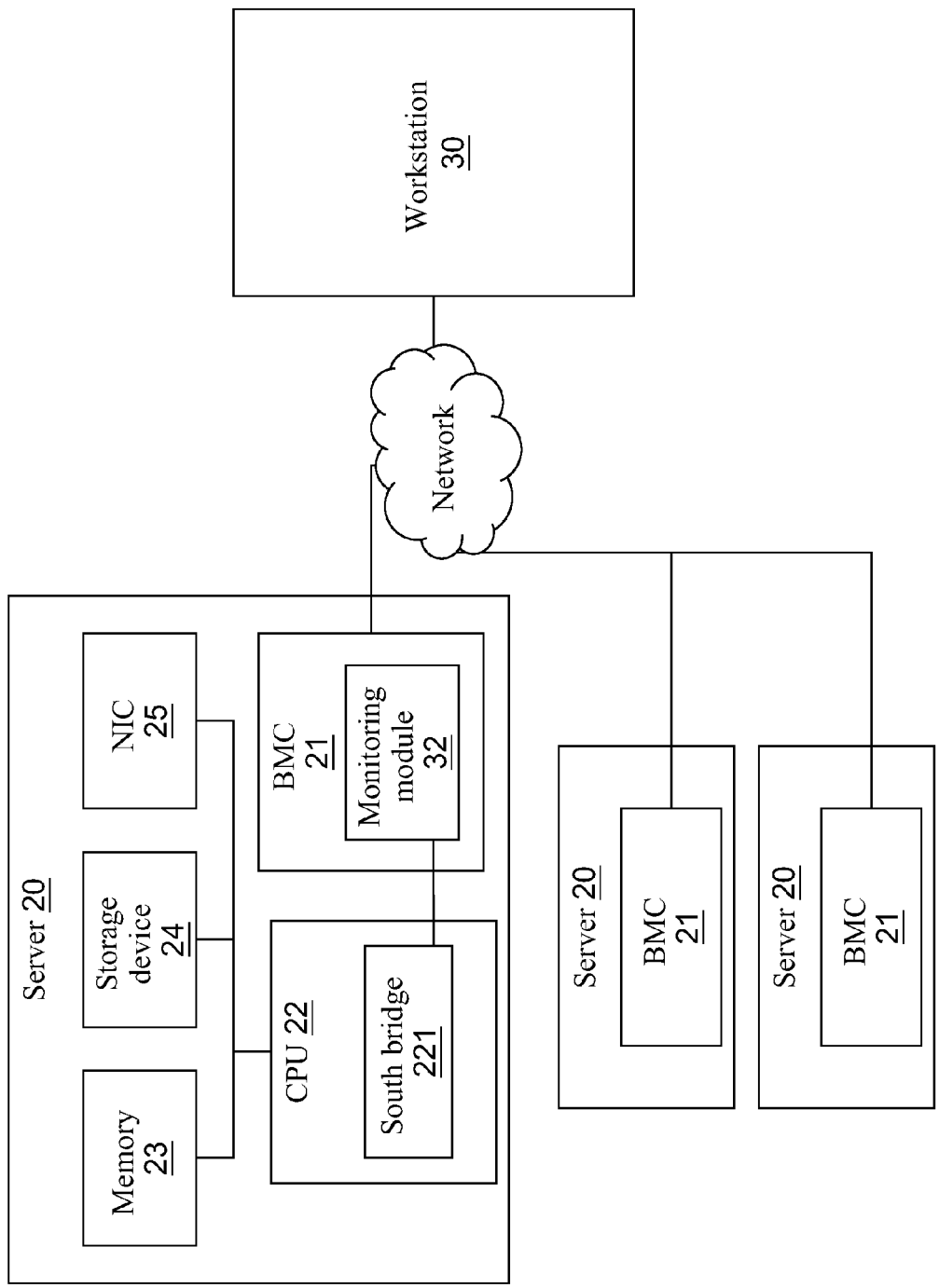
FIG. 1B is a schematic view of a server according to another embodiment.

FIG. 1B is a schematic view of a server according to another embodiment of the present invention. The workstation 30 or the BMC 21 may comprise a monitoring module 32 for testing the server 20. For example, the monitoring module 32 may use the iLO system of HP company, the iDRAC system of DELL company, or the ESB2 system of Intel company.

The method for testing the server supporting the IPMI may comprise a local test mode and a remote test mode. In the local test mode, the method is performed by the monitoring module 32 of the server 20. In the remote mode, the method is performed by the monitoring module 32 of the workstation 30.

Figure 2:
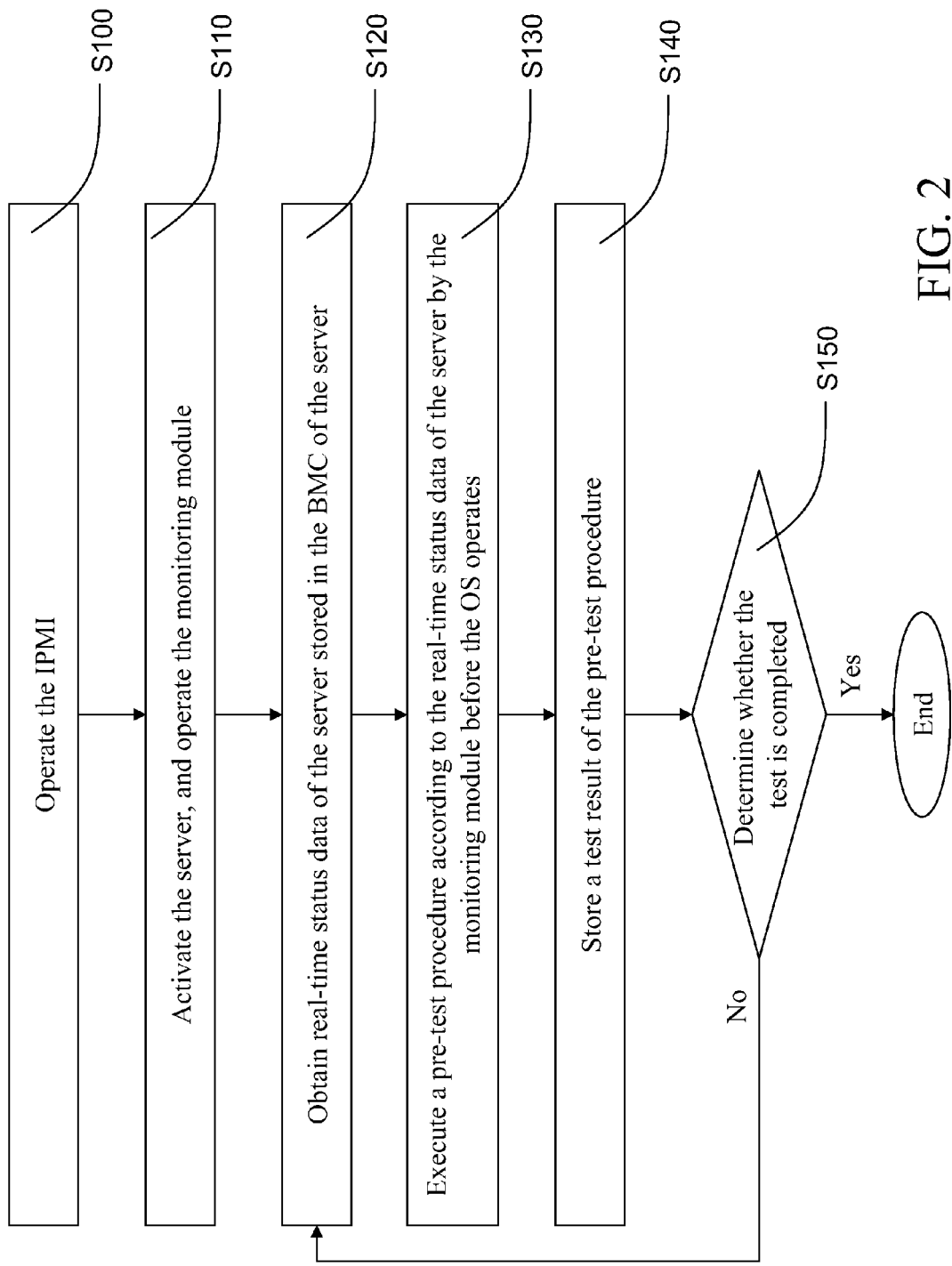
FIG. 2 is a flow chart of a method for testing a server supporting an IPMI according to an embodiment.

FIG. 2 is a flow chart of a method for testing a server supporting an IPMI according to an embodiment of the present invention.

The BMC 21 or the monitoring module 32 that performs the method for testing the server supporting the IPMI firstly operates the IPMI (Step S100). Then, the server 20 is activated, and the monitoring module 32 is operated (Step S110). Real-time status data of the server 20 stored in the BMC 21 of the server 20 is obtained (Step S120). The monitoring module 32 executes a pre-test procedure according to the real-time status data of the server 20 before the OS operates (Step S130). The BMC 21 stores a test result of the pre-test procedure (Step S140).

The real-time status data is obtained by the BMC 21 in the manner of monitoring each hardware module through the sensor. In the remote test mode, the BMC 21 transmits the test result to the monitoring module 32.

Figure 3:
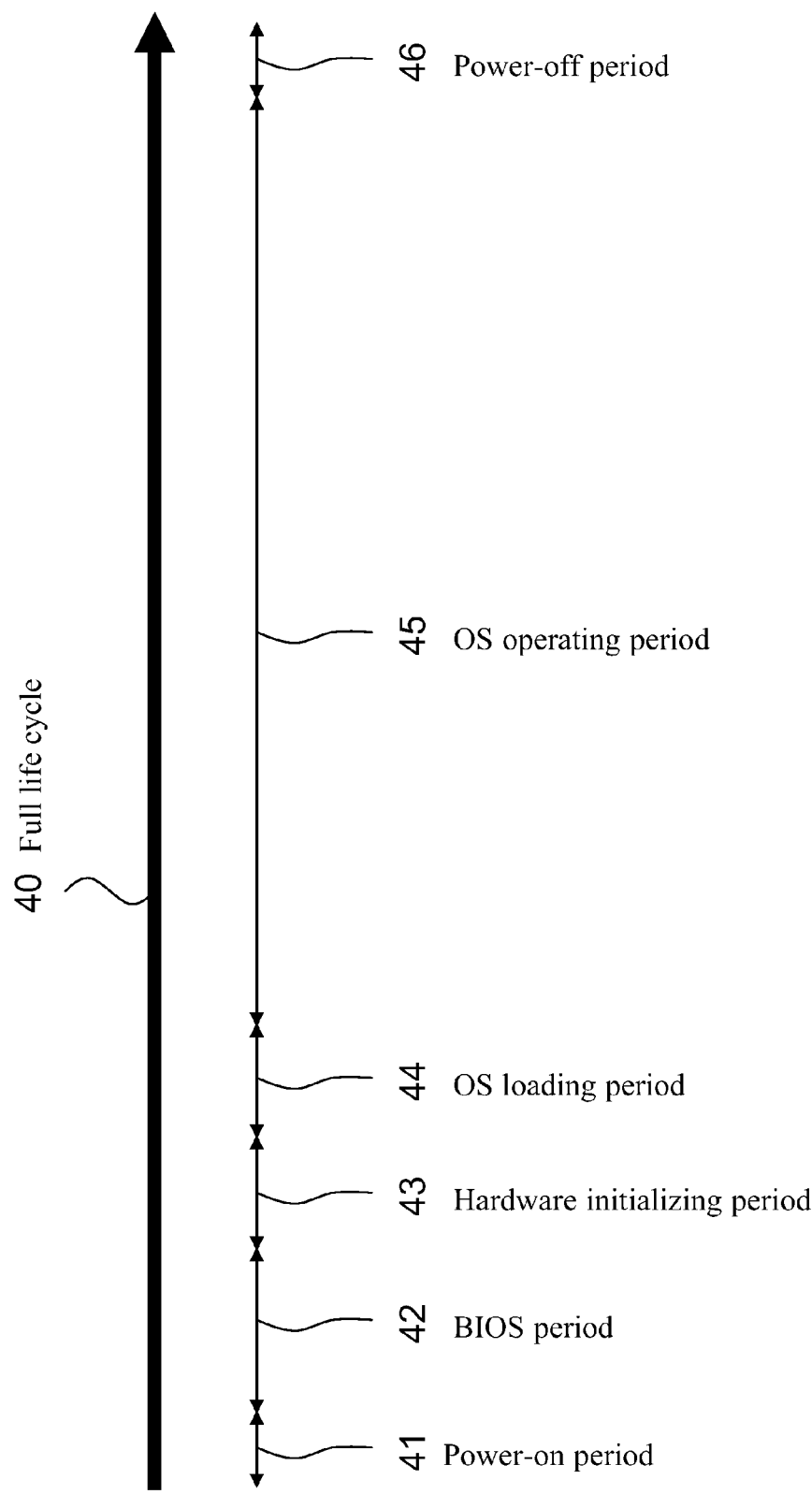
FIG. 3 is a schematic view of a full life circle according to an embodiment.

FIG. 3 is a schematic view of a full life circle according to an embodiment of the present invention. The full life cycle 40 of the server 20 comprises a power-on period 41, a basic input/output system (BIOS) period 42, a hardware initializing period 43, an OS loading period 44, an OS operating period 45, and a power-off period 46. When the server 20 is in the power-on period 41, the BIOS period 42, the hardware initializing period 43, and the OS loading period 44, the OS of the server 20 has not been completely loaded, and thus cannot operate.

Step S130 is performed before the OS operating period 45 of the full life period 40, in which the monitoring module 32 commands the BMC 21 to execute the pre-test procedure. More specifically, the BMC 21 may receive a test command comprising items to be tested and test content, so as to test the server 20. When the method for testing the server supporting the IPMI is performed, multiple test commands may be compiled into a script to act as the monitoring module 32.

According to different embodiments of the present invention, the pre-test procedure may comprise a power management switch test procedure, an OS loading test procedure, a reboot test procedure, or a BIOS loading test procedure.

The power management switch test procedure may comprise a switch test procedure performed among multiple advanced configuration and power management interface (ACPI) operating modes of the server 20 after the BIOS period 42. Generally, the ACPI operating modes may be divided into six types from S0 to S5, as described in the following.

The S0 operating mode is also called a normal working state, in which both the OS and the application program of the server 20 are running In this mode, the power consumption is generally greater than 80 W.

The S1 operating mode is Power on Suspend (POS), which is the most power-consuming mode. In this mode, the CPU 22 stops executing commands, while the power supply for the CPU 22 and the memory 23 is still remained, and other hardware modules in the server 20 also operate normally. The power consumption of this mode is generally lower than 30 W.

The S2 operating mode is in a deeper sleep state than the S1 operating mode; however, the CPU 22 is no longer supplied with power, and the clock of the bus is turned off.

The S3 operating mode is also called a sleep, standby, or Suspend to RAM (STR) mode. In this mode, the memory 23 is still supplied with power. Since the states of the OS, all the application programs, and opened files are stored in the memory 23, the user may recover the operation to the state before entering the S3 operating mode. In the S3 operating mode, the power consumption is generally lower than 10 W.

The S4 operating mode is also called a dormant, safe sleep, or Suspend to Disk (STD) mode, which is more power-saving than the S3 operating mode. In this mode, all the contents of the memory 23 are stored in the storage device 24 (that is, the non-violate memory). In the S3 operating mode, once the power is off, all the data in the memory 23 will disappear, while the power failure has no impact on the data in the S4 operating mode.

The S5 operating mode is in a shutdown state, in which all the hardware modules are not supplied with power, and thus the power consumption is nearly 0.

In the pre-test procedure, a test of switching among the above ACPI operating modes may be performed for the server 20.

In addition, the BMC 21 may further perform a post-test procedure in the OS operating period 45, to fully test the server 20 in the full life circle 40. After the test is carried out according to the test command, it is determined whether the test is completed (Step S150). If not, the procedure returns to Step S120 to receive the real-time status data and continue testing.

The post-test procedure may comprise some hardware stress tests, such as a CPU test procedure, a memory test procedure, a storage device test procedure, or an NIC test procedure. In another words, in the post-test procedure, each hardware module of the server 20 is tested in the OS operating period 45.

The method for testing the server supporting the IPMI may cover items related to OS reboot or shutdown, and may also test whether the server works properly before the OS is started. Therefore, the method supports various OSs, and provides a more comprehensive test for the BMC. In addition, by executing the pre-test procedure, the method can be performed before the OS operates. As such, a complete test can be performed in the full life circle of the server.

What is claimed is:

1. A method for testing a server supporting an intelligent platform management interface (IPMI), applied to test the server before an operating system (OS) of the server operates, the method comprising:
   activating a baseboard management controller (BMC) of the server;
   activating the server, and operating a monitoring module;
   obtaining real-time status data of the server stored in the BMC;
   executing a pre-test procedure according to the real-time status data of the server by the monitoring module before the OS operates, wherein the pre-test procedure comprises a power management switch test procedure performed for the server; and
   storing a test result of the pre-test procedure.

2. The method for testing the server supporting the IPMI according to claim 1, wherein the power management switch test procedure comprises a switch test procedure performed among multiple advanced configuration and power management interface (ACPI) operating modes of the server after a basic input/output system (BIOS) period of the server.

3. The method for testing the server supporting the IPMI according to claim 1, wherein the pre-test procedure comprises a BIOS loading test procedure.

4. The method for testing the server supporting the IPMI according to claim 1, further comprising: executing a post-test procedure, wherein the post-test procedure comprises a central processing unit (CPU) test procedure, a memory test procedure, a storage device test procedure, or a network interface card (NIC) test procedure.

5. The method for testing the server supporting the IPMI according to claim 1, comprising a local test mode, wherein in the local test mode, the method is performed by the monitoring module of the server.

6. The method for testing the server supporting the IPMI according to claim 1, comprising a remote test mode, wherein in the remote test mode, the method is performed by the monitoring module of a workstation; the workstation is connected with the BMC, and the BMC transmits the test result to the monitoring module.

7. The method for testing the server supporting the IPMI according to claim 1, wherein the OS of the server is a disk operating system (DOS), a windows OS, a Linux OS, or an extensible firmware interface (EFI).

8. A method for testing a server supporting an intelligent platform management interface (IPMI), applied to test the server before an operating system (OS) of the server operates, the method comprising:
   activating a baseboard management controller (BMC) of the server;
   activating the server, and operating a monitoring module;
   obtaining real-time status data of the server stored in the BMC;
   executing a pre-test procedure according to the real-time status data of the server by the monitoring module before the OS operates, wherein the pre-test procedure comprises an OS loading test procedure; and
   storing a test result of the pre-test procedure.

9. A method for testing a server supporting an intelligent platform management interface (IPMI), applied to test the server before an operating system (OS) of the server operates, the method comprising:
   activating a baseboard management controller (BMC) of the server;
   activating the server, and operating a monitoring module;
   obtaining real-time status data of the server stored in the BMC;
   executing a pre-test procedure according to the real-time status data of the server by the monitoring module before the OS operates, wherein the pre-test procedure comprises a reboot test procedure; and
   storing a test result of the pre-test procedure.

* * * * *